United States Patent Office 3,262,809
Patented July 26, 1966

3,262,809
SIZE COMPOSITION FOR GLASS, AND TREATED GLASS STRUCTURES AND METHOD FOR MANUFACTURING SAME
Jesse Irwin Aber, Newark, Ohio, assignor to Owens-Corning Fiberglas Corporation, a corporation of Delaware
No Drawing. Continuation of application Ser. No. 476,548, Dec. 20, 1954. This application June 29, 1962, Ser. No. 206,197
18 Claims. (Cl. 117—72)

This is a continuation of my copending application Ser. No. 476,548, filed December 20, 1954, entitled, "Size Composition for Glass, and Treated Glass Structures and Method for Manufacturing Same," now abandoned.

This invention relates to structures formed of combinations of synthetic organic resinous materials and glass, such as glass fibers or thin flexible films of glass in which the surfaces of the glass are treated with a size composition to improve the performance and processing characteristics of the glass and to render the surfaces of the glass bodies more receptive to the resinous materials and more easily and rapidly wet out by the resinous materials employed in combinations therewith in the manufacture of coated fabrics, reinforced plastics and laminates.

Modification of the surfaces of the glass bodies to make them more receptive to the resinous materials achieves the desired improvement in the ability of the resinous material rapidly and completely to wet out the glass surfaces and the development of a stronger and more permanent bonding relation between glass and resin in the manufacture of the described structures.

Without pre-treatment of the surfaces of the glass fibers or other glass film to make them more receptive to the resinous materials employed in combinations therewith, it is difficult to achieve satisfactory coverage of the glass and it has been found to be relatively impossible to develop a sufficient degree of bonding between the resinous material and the glass because the groupings that predominate on the glass surfaces render such surfaces hydrophilic, or water-loving in character and more or less resinophobic, or repellent to resinous material. As a result, the resinous materials applied to the glass tend to draw away from the surfaces and form into droplets which can be relatively easily separated from the surface upon drying. Any bonding relation which is established is only temporary in nature because a moisture film preferentially forms on the glass surfaces, under high humidity conditions, and the moisture film separates the resinous material from the glass surface substantially to minimize the bonding relation.

In order to enhance the manufacture of combinations of glass and resin, it is important either to modify the characteristics of the glass surfaces to convert the hydrophilic surface into one that is resinophilic so that it will be preferentially wet out with the applied resinous material or else to formulate the resinous material with an agent capable of functioning as an anchoring agent which attaches to the hydrophilic glass fiber surfaces through some components of the compound while other portions are available for attachment to the resinous material. Where the glass fibers or films are fabricated separate and apart from the combinations thereof with resinous material, it is desirable to employ the first system in which the glass surfaces are modified and, in which the surfaces are concurrently protected against destruction or deterioration prior to their combinations with resinous materials. It is in this latter system to which the concepts of this invention are directed and it is an object of this invention to produce glass bodies, such as glass fibers and films of glass, sized with the material that renders the surfaces resinophilic in character, which lubricates and protects the surfaces against destruction or deterioration prior to combinations with the resinous materials and which hastens the wetting out of the glass surfaces with the resinous materials and enhances the manufacture of structures embodying such combinations and it is a related object to produce a treating composition for use in same.

It is another object of this invention to produce and to provide a method for producing treated glass fibers and films of the type described in which the surfaces are more rapidly and completely wet out with resinous materials used in combinations therewith and in which the glass materials are more effectively combined with such resinous materials to enable more efficient manufacture of fibrous structures having improved physical and strength characteristics.

Briefly described, this invention is directed to the treatment of surfaces of glass with a composition that functions as a size to lubricate and protect the glass surfaces and to achieve more rapid and complete wetting out of the glass with resinous materials usually combined therewith in the manufacture of reinforced plastics and laminates. Representative of such resinous materials are thermosetting resins, such as unsaturated polyester resins, epoxy resins, phenol formaldehyde resins, urea formaldehyde resins, melamine formaldehyde resins and the like heat-curable resins. Resinous materials combined with glass fibers in the manufacture of coated fabrics may be represented by polyvinyl chlorides, vinyl chloride-vinyl acetate copolymers, polyamides, polyalkylacrylates, polyethylene and elastomers of the type butadiene-acrylonitrile copolymers, butadiene-styrene copolymers, and the like.

A treating composition containing ingredients for producing the desired characteristics on glass fiber surfaces, when applied as a size, is illustrated by the following:

*Example 1*

2.0 percent by weight of a saturated polyester (Glidden GRV 2172)
0.25 percent by weight of the condensation reaction product of pelargonic acid and tetraethylene pentamine solubilized with acetic acid
2.0 percent by weight methacrylato chromic chloride (20% solution in isopropanol, acetone and water)
0.10 percent by weight polyvinyl alcohol
0.02 percent by weight Pluronic F68 (Wyandotte Chemical Company).

These materials are combined in the amounts described with water and adjusted with acetic acid to a pH of between 4.5 and 5.5. It is preferred to form an aqueous dispersion of the polyester resin with ammonium hydroxide or the like amine as the dispersing agent, and then stabilize the dispersion by the addition of the polyvinyl alcohol. The solubilized dispersion can then be converted, if desired, to the acid side by the addition of acetic acid where the cationic amine acetate has greater stability. It is preferred to adjust the composition to a pH of between 4.5 and 5.5 but it will be understood that the composition may be formulated to have either an acid or basic pH, as will hereinafter be pointed out.

Application of the size composition is preferentially made to the bare surfaces of the glass, such as by conventional sizing means including a roller coater, wiping pad or the like when applied to the glass fiber surfaces in forming, or by means of a brush, spray, roller or wiper pad when applied to fibers or films of glass and the like. If other materials have previously been applied to the glass surfaces, such other materials should be removed by washing or by burning off before the treating composition is applied. The treating composition should be applied in amounts sufficient to form a substantially continuous coating on the glass fiber surfaces when dried, such as by air drying. It is preferred, however, to bake the coating on the surface by exposure to temperatures within the range of 200–300° F. to modify the glass surfaces and to improve the bonding relation of resinous materials subsequently applied in combinations therewith.

The saturated polyester functions as a film former in the treating composition to protect the surfaces of the glass and to improve the processing and performance characteristics of glass fibers. It is desirable to make use of a saturated polyester resin formed of a dihydric alcohol and a saturated dibasic acid, otherwise the film former will become incompatible with the subsequently applied resinous material and would therefore present a barrier to the development of the desired bonding relation between the resinous material and the glass surfaces. A saturated polyhydric alcohol and a saturated polybasic acid other than the dihydric alcohols and dibasic acids may be used as long as the polyester formulated in the treating composition has been arrested in its reaction before being advanced to an isoluble or infusible state when applied to the glass fibers. The amount of saturated polyester in the treating composition may range from a minimum of 0.25 percent by weight to a maximum of about 5.0 percent by weight of the treating composition.

The polyvinyl alcohol can be used in the treating composition in amounts ranging from 0.01 to 0.50 percent by weight of the treating composition. Instead of polyvinyl alcohols, use may be made of other water soluble, water stable, hydrophilic colloids, such as casein, alginates, cellulose ethers and esters of the type methyl cellulose, carboxymethyl cellulose and the like, in substantially equivalent amounts as polyvinyl alcohol except that less of the alginate or cellulose ether and ester salts will be required.

The pelargonate amide appears readily to wet out the surfaces of the glass without interfering with the ability of the treated glass fiber surfaces to be rapidly wet out with resinous materials which are afterwards applied in the manufacture of the resinous combinations. Other cationic amine lubricants may be used, such as tetraethylene pentamine reacted to contain 5 methallyl side chains (Arnold Hoffman compound RL 220), tetraethylene pentamine stearic acid condensate insolubilized with acetic acid, dicoco fatty acid amine chloride and other long chain organic or fatty acid groups containing an amine or a basic nitrogen atom capable of being formed into salt, quaternary ammonium compound or onium compound. In compositions embodying features of this invention, the amine lubricant or other cationic amine lubricant capable of reacting as an amine is used in concentrations ranging from 0.01 to 2.0 percent by weight of the treating composition.

The Pluronic F68 appears to function in preference to many other types of compounds as an emulsion stabilizer for the treating composition. Technically this type of material may be defined as a co-generic mixture of conjugated polyoxyethylene - polyoxypropylene compounds containing in their structure oxypropylene groups and oxyethylene groups on an organic radical derived from a polybasic carboxylic acid having a molecular weight less than 200. The compounds of this type which may be used in the practice of this invention are characterized in that all of the oxypropylene groups are present in polyoxypropylene chains attached to the organic radical at the site of a reactive hydrogen atom thereby constituting a polyoxypropylene polymer. The polyoxyethylene groups are attached to the polyoxypropylene polymer in polyoxyethylene chains. The average molecular weight of the polyoxypropylene polymers in the mixture is at least 900 and the polyoxyethylene groups represent about 20–90 percent by weight of the mixture. The compound Pluronic F68 has a molecular weight average of about 2000–3000 and is constituted with about 80 percent oxyethylene groups. Other similar compounds of the type described in U.S. Patent No. 2,674,619 may be employed. It is preferred to make use of such emulsion stabilizer in concentrations ranging from 0.005 to 0.05 percent by weight of the treating composition.

Instead of the methacrylato chromic chloride, use may be made of chromic chloride, but it is preferred to make use of the chromic complex compounds of the Werner type in which the acido group attached to the nuclear chromium atom is preferably formed with a short chained aliphatic group or an aromatic group having a short aliphatic group in which the aliphatic group contains a highly functional group such as an unsaturated carbon to carbon linkage capable of addition polymerization or other functional groups such as a group having a high dipole moment, a labile hydrogen atom, or a highly negative group adjacent an available free hydrogen. Representative compounds are illustrated in the Steinman Patent No. 2,552,910. Instead of a chromic complex compound having a short chained aliphatic or aliphatic-aromatic group, use can be made of chromic complex compounds in which the acido group is represented by an organic group having more than 8 carbon atoms, particularly where additional lubricity is desirable, such as stearato chromic chloride or other Werner compounds of the type described in the Iler Patent No. 2,273,040.

The chromic complex, especially compounds having an acido group of short carbon length and containing an unsaturated carbon to carbon linkage or other highly functional group, such as methacrylato chromic chloride, methallyl chromic chloride, vinyl chromic chloride and the like, appears to have a unique quality of stabilizing the emulsion and hardening the finished cakes of sized glass fibers so that they can be more easily processed into a finished roving and which can be more easily cut in the preform operation. For this purpose, the chromic complex compound should be employed in concentrations within the range of 0.10 to 10.0 percent by weight of the treating composition.

Where it is desirable to achieve maximum utilization of the strength properties of the glass fibers or film in the coated fabric or reinforced plastic or laminate, it is a further concept of this invention to make use of an anchoring agent in the form of an organo silicon compound in addition to the chromic complex compound. For such purpose, it is preferred to make use of an organo silane or its hydrolysis products having two or more hydrolyzable groups and an organic group attached directly to the silicon atom containing less than 7 carbon atoms in aliphatic arrangement and in which the aliphatic group contains an unsaturated carbon to carbon linkage capable of addition polymerization. The aliphatic group may contain other highly functional groups of the type previously described. Representative of such organo silanes is vinyltrichlorosilane, vinyltriacetoxysilane, styryldihydroxysilane, allyltriacetoxysilane and the like. When present, use can be made of the organo silane in amounts ranging from 0.01 to 1.0 percent by weight of the treating composition.

Having described the functions of the various ingredients which are formulated together in the manufacture of a treating composition for application to glass fibers and the like to improve their processing and performance characteristics, to improve the bonding relation of the resinous materials employed in combinations therewith and to improve the thoroughness and speed of wetting out of the fibers with the applied resinous materials and to enhance the materials of the end product, illustration will now be made of formulations both broadly and specifically of treating compositions which may be used in the practice of this invention.

*Example 2*

0.25–5.0 percent by weight saturated polyester
0.01–2.0 percent by weight cationic amine lubricant
0.10–10.0 percent by weight Werner complex compound
0.01–0.5 percent by weight water soluble, water stable hydrophilic colloid
0.005–0.05 percent by weight of a co-generic mixture of conjugated polyoxyethylene-polyoxypropylene compounds on a polybasic carboxylic acid having a molecular weight less than 200.

*Example 3*

0.25–5.0 percent by weight saturated polyester
0.01–2.0 percent by weight cationic amine lubricant
0.10–2.0 percent by weight Werner complex compound
0.01–0.5 percent by weight water soluble, water stable hydrophilic colloid
0.005–0.05 percent by weight of a co-generic mixture of conjugated polyoxyethylene-polyoxypropylene compounds on a polybasic carboxylic acid having a molecular weight less than 200
0.01–1.0 percent by weight unsatuarted organo silane.

*Example 4*

2.0 percent by weight saturated polyester (Glidden GRV 2172)
2.25 percent by weight tetraethylene pentamine stearate lubricant
0.5 percent by weight methacrylato chromic chloride
0.3 percent by weight vinyltrichlorosilane
0.14 percent by weight polyvinyl alcohol
0.02 percent by weight Pluronic F68.

The above materials are combined in the desired percentage in water and adjusted to a pH of between 4.5 and 6.

*Example 5*

3.0 percent by weight saturated polyester
0.5 percent by weight dicoco fatty acid amine chloride
2.0 percent by weight methallyl chromic chloride
0.04 percent by weight sodium alginate
0.04 percent by weight of the compound of U.S. Patent No. 2,674,619.

*Example 6*

2.0 percent by weight saturated polyester
0.3 percent by weight fatty acid cationic amine acetate
0.4 percent by weight methacrylato chromic chloride
0.4 percent by weight allyltriethoxysilane
0.1 percent by weight methylcellulose
0.03 percent by weight of a co-generic mixture of conjugated polyoxyethylene-polyoxypropylene chains on a polybasic carboxylic acid in which the polyoxyethylene groups are present in amounts ranging from 20–90 percent by weight and in which the molecular weight is at least 900.

Stable compositions of the type embodying features of this invention may be formulated with the Pluronic F68 and the like conjugated polyoxyethylene-polyoxypropylene polybasic carboxylic acid compound replaced by alkylene oxide condensation products of dimerized fatty acid alkylol amides of the type described in U.S. Patent No. 2,470,087, marketed by the American Cyanamid Company under the trade name of "Aerotex." These compounds, though not equivalent to the conjugated polyoxyethylene-polyoxypropylene polybasic carboxylic acid compounds, may be used in the formulations in amounts ranging from 0.15–2.0 percent by weight and preferably in the amounts of 0.25–1.0 percent by weight of the materials in the size composition.

Formulations representative of the use of the above materials may be illustrated as follows:

*Example 7*

2.0 percent by weight of a saturated polyester resin
0.25 percent by weight of the condensation reaction product of pelargonic acid and tetraethylene pentamine solubilized with acetic acid
2.0 percent by weight methacrylato chromic chloride (20% solution)
0.1 percent by weight polyvinyl alcohol (medium viscosity grade)
0.25–1.0 percent by weight of the alkylene oxide condensation reaction product of dimerized linoleic acid alkylol amide.

Materials are combined in the amounts described and diluted with water and adjusted with acetic acid or other inorganic or preferably an organic acid to the desired acidic pH.

*Example 8*

3.0 percent by weight of a saturated polyester resin
0.15 percent by weight of the condensation reaction product of stearic acid and tetraethylene pentamine solubilized with acetic acid
2.0 percent by weight of methacrylato chromic chloride in 20% solution in isopropanol, acetone and water
0.1 percent by weight polyvinyl alcohol
0.5 percent by weight Aerotex—American Cyanamid Company (Patent No. 2,470,081)
94.25 percent by weight water The alkylene oxide condensation products of dimerized and trimerized fatty acid alkylol amides appear to confine and protect the particles of saturated polyester resins in the emulsion in a manner to prevent agglomeration or adhesion one to the other upon contact in the emulsion and thereby markedly to improve the stability of the treating composition.

In each of these formulations, the ingredients are combined in the described percentage in water to form an aqueous emulsion which is preferably adjusted to a pH of between 4.5 ad 5.5 by the addition of acetic acid or the like acidic medium, if on the basic side, or by the addition of ammonia or the like amine, if on the acid side.

Treatment may be carried out, as previously described in connection with Example 1 to produce glass fibers and films which are easily and quickly wetted out with unsaturated polyester resins and the like thermosetting resins combined with glass fibers and which develop a satisfactory bonding relation with the treated glass fiber surfaces.

It will be understood that changes may be made in the details of the formulations, their method of application and treatment without departing from the spirit of the invention, especially as defined in the following claims.

I claim:

1. A composition for use in the treatment of glass surfaces for protecting the surface and for modification of the surface to make it more easily and completely wettable by resinous materials combined therewith in the manufacture of resinous combinations and to improve the bonding relation between the resinous materials and the glass surfaces, consisting essentially of the following ingredients given in percent by weight:

0.25–5.0 percent saturated polyester resin in an uncured and soluble state formed of a saturated polyhydric alcohol and a saturated polybasic acid and in which the saturated polyester resin is a partly reacted polyester resin when formed by reaction of a saturated polyhydric alcohol other than a difunctional alcohol and a polybasic acid other than a dibasic acid 0.1–2.0 percent amine lubricant
0.1–10.0 percent Werner complex compound, in which the carboxylato group coordinated with the trivalent nuclear chromium atom contains less than 7 carbon atoms in an aliphatic group and in which the aliphatic group also contains a highly functional group
0.01–0.5 percent water soluble hydrophilic colloid
0.005–0.05 percent emulsion stabilizer
99.535–82.45 percent water.

2. A composition for use in the treatment of glass fibers for protection of the glass fiber surfaces and for modification of the glass fiber surfaces to make the fibers more readily wettable by resinous materials combined therewith in the manufacture of resinous combinations and to improve the bonding relation between the resinous material and the glass fiber surfaces, comprising in percent by weight:

0.25–5.0 percent saturated polyester resin in an uncured and soluble state formed of a saturated polyhydric alcohol and a saturated polybasic acid and in which the saturated polyester resin is a partly reacted polyester resin when formed by reaction of a saturated polyhydric alcohol other than a difunctional alcohol and a polybasic acid other than a dibasic acid
0.1–2.0 percent amine lubricant
0.1–10.0 percent Werner complex compound, in which the carboxylato group coordinated with the trivalent nuclear chromium atom contains less than 7 carbon atoms in an aliphatic group and in which the aliphatic group also contains a highly functional group
0.01–0.5 percent polyvinyl alcohol
0.005–0.05 percent stabilizer in the form of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
99.535–82.45 percent water.

3. A composition for use in the treatment of glass fibers for protection of the glass fiber surfaces and for modification of the glass fiber surfaces to make the fibers more readily wettable by resinous materials combined therewith in the manufacture of resinous combinations and to improve the bonding relation between the resinous material and the glass fiber surfaces, consisting essentially of the following in percent by weight:

0.25–5.0 percent saturated polyester resin formed essentially of a saturated dibasic acid and a dihydric alcohol
0.1–2.0 percent amine lubricant
0.1–10.0 percent Werner complex compound in which the acido group coordinated with the trivalent nuclear chromium atom is formed with an organic group containing less than 7 carbon atoms in aliphatic arrangement and a highly functional group
0.01–0.5 percent water soluble hydrophilic colloid
0.005–0.05 percent stabilizer in the form of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
99.535–82.45 percent water.

4. A composition for use in the treatment of glass fibers for protecting the surface and for modification of the surface to make it more easily and completely wettable by resinous materials combined therewith in the manufacture of resinous combinations and to improve the bonding relation between the resinous materials and the glass surfaces, consisting essentially of the following ingredients given in percent by weight:

0.25–5.0 percent saturated polyester resin formed essentially of a saturated dibasic acid and a dihydric alcohol
0.1–2.0 percent amine lubricant
0.1–10.0 percent methacrylato chromic chloride
0.1–0.5 percent water soluble hydrophilic colloid
0.005–0.05 percent emulsion stabilizer
99.535–82.45 percent water.

5. A composition for use in the treatment of glass to protect the surfaces of the glass and to modify the surfaces to make them more easily and completely wettable by resinous materials combined therewith in the manufacture of resinous combinations and to improve the bonding relation between the resinous material and the glass surface, comprising an aqueous system consisting of the following materials in percent by weight:

0.25–5.0 percent saturated polyester resin in an uncured and soluble state formed of a saturated polyhydric alcohol and a saturated polybasic acid and in which the saturated polyester resin is a partly reacted polyester resin when formed by reaction of a saturated polyhydric alcohol other than a difunctional alcohol and a polybasic acid other than a dibasic acid
0.01–2.0 percent cationic amine lubricant
0.1–2.0 percent Werner complex compound in which the carboxylato group coordinated with the trivalent nuclear chromium atom contains less than 7 carbon atoms in an aliphatic group and in which the aliphatic group also contains a highly functional group
0.01–0.5 percent water soluble hydrophilic colloid
0.005–0.05 percent emulsion stabilizer
0.01–1.0 percent of an organo silane and hydrolysis product thereof in which the silane has an organic group attached directly to the silicon atom having less than 7 carbon atoms and containing a highly functional group
99.615–89.45 percent water.

6. A composition for use in the treatment of glass fibers for protection of the glass fiber surfaces and for modification of the glass fiber surfaces to make the fibers more readily wettable by resinous materials combined therewith in the manufacture of resinous combinations and to improve the bonding relation between the resinous material and the glass fiber surfaces, comprising in percent by weight:

0.25–5.0 percent saturated polyester resin formed essentially of a saturated dibasic acid and a dihydric alcohol
0.01–2.0 percent cationic amine lubricant
0.1–2.0 percent Werner complex compound in which the acido group coordinated with the trivalent nuclear chromium atom contains less than 7 carbon atoms in an aliphatic group and in which the aliphatic group also contains a highly functional group
0.01–0.5 percent water soluble hydrophilic colloid
0.005–0.05 percent of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
0.01–1.0 percent of an organo silane and hydrolysis product thereof in which the silane has an organic group attached directly to the silicon atom having less than 7 carbon atoms and containing a highly functional group
99.615–89.45 percent water.

7. A composition for use in the treatment of glass fibers for protection of the glass fiber surfaces and for modification of the glass fiber surfaces to make the fibers more readily wettable by resinous materials combined therewith in the manufacture of resinous combinations and to improve the bonding relation between the resinous material and the glass fiber surfaces, consisting essentially of the following in percent by weight:

0.25–5.0 percent saturated polyester resin in an uncured and soluble state formed of a saturated polyhydric alcohol and a saturated polybasic acid and in which the saturated polyester resin is a partly reacted polyester resin when formed by reaction of a saturated polyhydric alcohol other than a difunctional alcohol and a polybasic acid other than a dibasic acid
0.01–2.0 percent cationic amine lubricant
0.1–2.0 percent Werner complex compound in which the carboxylato group coordinated with the trivalent nuclear chromium atom contains less than 7 carbon atoms in an aliphatic group and in which the aliphatic group also contains a highly functional group
0.01–0.5 percent polyvinyl alcohol
0.005–0.05 percent of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
0.01–1.0 percent of an organo silane and hydrolysis product thereof in which the silane has an organic group attached directly to the silicon atom having less than 7 carbon atoms and containing a highly functional group
99.615–89.45 percent water.

8. A size composition for use in the treatment of glass to protect the surfaces thereof and to render the surfaces more receptive to polyester resins combined therewith in the manufacture of coated fabrics and reinforced plastics in which the size composition consists of the following in percent by weight:

0.25–5.0 percent saturated polyester resin formed essentially of a saturated dibasic acid and a dihydric alcohol
0.01–2.0 percent methacrylato chromic chloride
0.01–2.0 percent cationic amine lubricant
0.01–0.5 percent polyvinyl alcohol
0.01–1.0 percent of an organo silane and hydrolysis prod- attached directly to the silicon atom containing less than 7 carbon atoms and a highly functional group
0.005–0.05 percent of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
99.615–89.45 percent water.

9. A glass structure and a coating on the surfaces of the glass to protect the surface and to render the surface more highly receptive to resinous materials combined therewith in the manufacture of glass-resinous structures in which the coating comprises the combination of the following materials in parts by weight:

0.25–5.0 parts saturated polyester resin in an uncured and soluble state formed essentially of a saturated dibasic acid and a dihydric alcohol and in which the saturated polyester resin is a partly reacted polyester resin when formed by reaction of a saturated polyhydric alcohol other than a difunctional alcohol and a polybasic acid other than a dibasic acid
0.1–2.0 parts amine lubricant
0.1–10.0 parts Werner complex compound in which the carboxylato group coordinated with the trivalent nuclear chromium atom contains less than 7 carbon atoms in an aliphatic group and in which the aliphatic group also contains a highly functional group
0.01–0.5 parts water soluble hydrophilic colloid
0.005–0.05 parts emulsion stabilizer.

10. A glass structure and a coating on the surfaces of the glass to protect the surface and to render the surface more highly receptive to resinous materials combined therewith in the manufacture of glass-resinous structures in which the coating comprises the combination of the following materials in parts by weight:

0.25–5.0 parts saturated polyester resin formed essentially of a saturated dibasic acid and a dihydric alcohol
0.01–2.0 parts cationic amine lubricant
0.1–2.0 parts Werner complex compound in which the carboxylato group coordinated with the trivalent nuclear chromium atom contains less than 7 carbon atoms in an aliphatic group and in which the aliphatic group also contains a highly functional group
0.01–0.5 parts of water soluble hydrophilic colloid
0.005–0.05 parts emulsion stabilizer
0.01–1.0 parts of an organo silane and hydrolysis product thereof in which the silane has an organic group attached directly to the silicon atom having less than 7 carbon atoms and containing a highly functional group.

11. Glass fibers and a coating on the glass fiber surfaces to protect the glass fibers and to render the glass fibers more easily wet out with polyester resins and to improve the bonding relation between the polyester resins and the glass fiber surfaces in which the coating consists essentially of the combination of the following materials in parts by weight:

0.25–5.0 parts saturated polyester resin formed essentially of a saturated dibasic acid and a dihydric alcohol
0.01–2.0 parts methacrylato chromic chloride
0.1–2.0 parts cationic amine lubricant
0.01–0.5 parts polyvinyl alcohol
0.01–1.0 parts of an organo silane and hydrolysis product thereof in which the silane has an organic group attached directly to the silicon atom containing less than 7 carbon atoms and a highly functional group
0.005–0.05 parts of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900.

12. In a product formed of glass fibers and a resinous material, the improvement which consists of a coating directly on the glass fiber surfaces to protect the glass fibers and to enhance the bonding relationship between the resinous material and the glass fiber surfaces in which the coating consists essentially of the following ingredients set forth in the proportions by weight:

0.25–5.0 parts by weight saturated polyester resin in an uncured and soluble state formed by the condensation reaction of a saturated polyhydric alcohol and a saturated polybasic acid and in which the saturated polyester resin is a partly reacted polyester resin when formed by reaction of a saturated polyhydric alcohol other than a difunctional alcohol and a polybasic acid other than a dibasic acid
0.1–2.0 parts by weight of a cationic amine lubricant
0.1–10.0 parts by weight of a Werner complex compound in which the carboxylato group coordinated with the trivalent nuclear chromium atom is formed with an organic group containing less than 7 carbon atoms in aliphatic arrangement and a highly functional group
0.01–0.5 parts by weight of a water soluble hydrophilic colloid
0.005–0.05 parts by weight of an emulsion stabilizer.

13. In a product formed of glass fibers and a resinous material, the improvement which consists of a coating directly on the glass fiber surfaces to protect the glass fibers and to enhance the bonding relationship between the resinous material and the glass fiber surfaces in which the coating is formed of the following ingredients set forth in the proportions by weight:

0.25–5.0 parts by weight saturated polyester resin formed essentially by the condensation reaction of a saturated dibasic acid and a dihydric alcohol
0.1–2.0 parts by weight of an amine lubricant
0.1–10.0 parts by weight of a Werner complex compound in which the carboxylato group coordinated with the trivalent nuclear chromium atom is formed with an organic group containing less than 7 carbon atoms in aliphatic arrangement and in which the aliphatic group also contains a highly functional group
0.01–0.5 parts by weight polyvinyl alcohol
0.005–0.05 parts by weight stabilizer in the form of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
99.535–82.45 parts by weight water.

14. In a product formed of glass fibers and a resinous material, the improvement which consists of a coating directly on the glass fiber surfaces to protect the glass fibers and to enhance the bonding relationship between the resinous material and the glass fiber surfaces in which the coating consists essentially of the following ingredients set forth in the proportions by weight:

0.25–5.0 parts by weight saturated polyester resin formed essentially by the condensation reaction of a saturated dibasic acid and a dihydric alcohol
0.1–2.0 parts by weight of an amine lubricant
0.1–10.0 parts by weight methacrylato chromic chloride
0.01–0.5 parts by weight water soluble hydrophilic colloid
0.005–0.05 parts by weight emulsion stabilizer
99.535–82.45 parts by weight water.

15. In a product formed of glass fibers and a resinous material, the improvement which consists of a coating directly on the glass fiber surfaces to protect the glass fibers and to enhance the bonding relationship between the resinous material and the glass fiber surfaces in which the coating consists essentially of the following ingredients set forth in the proportions by weight:

0.25–5.0 parts by weight saturated polyester resin in an uncured and soluble state formed by the condensation reaction of a saturated polyhydric alcohol and a saturated polybasic acid and in which the saturated polyester resin is a partly reacted polyester resin when formed by reaction of a saturated polyhydric alcohol other than a difunctional alcohol and a polybasic acid other than a dibasic acid
0.01–2.0 parts by weight of a cationic amine lubricant
0.1–2.0 parts by weight of a Werner complex compound in which the carboxylato group coordinated with the trivalent nuclear chromium atom contains less than 7 carbon atoms in an aliphatic group and in which the aliphatic group also contains a highly functional group
0.01–0.5 parts by weight water soluble hydrophilic colloid
0.005–0.05 parts by weight of an emulsion stabilizer
0.01–1.0 parts by weight of an organo silane and hydrolysis product thereof in which the silane has an organic group attached directly to the silicon atom having less than 7 carbon atoms and containing a highly functional group
99.615–89.45 parts by weight water.

16. In a product formed of glass fibers and a resinous material, the improvement which consists of a coating directly on the glass fiber surfaces to protect the glass fibers and to enhance the bonding relationship between the resinous material and the glass fiber surfaces in which the coating consists essentially of the following ingredients set forth in the proportions by weight:

0.25–5.0 parts by weight saturated polyester resin formed essentially by the condensation reaction of a saturated dibasic acid and a dihydric alcohol
0.01–2.0 parts by weight of a cationic amine lubricant
0.1–2.0 parts by weight of a Werner complex compound in which the carboxylato group coordinated with the trivalent nuclear chromium atom contains less than 7 carbon atoms in an aliphatic group and in which the aliphatic group also contains a highly functional group
0.01–0.5 parts by weight water soluble hydrophilic colloid
0.005–0.05 parts by weight of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
0.01–1.0 parts by weight of an organo silane and hydrolysis product thereof in which the silane has an organic group attached directly to the silicon atom having less than 7 carbon atoms and containing a highly functional group
99.615–89.45 parts by weight water.

17. In a product formed of glass fibers and a resinous material, the improvement which consists of a coating directly on the glass fiber surfaces to protect the glass fibers and to enhance the bonding relationship between the resinous material and the glass fiber surfaces in which the coating consists essentially of the following ingredients set forth in the proportions by weight:

0.25–5.0 parts by weight saturated polyester resin in an uncured and soluble state formed by the condensation reaction of a saturated polyhydric alcohol and a saturated polybasic acid and in which the saturated polyester resin is a partly reacted polyester resin when formed by reaction of a saturated polyhydric alcohol other than a difunctional alcohol and a polybasic acid other than a dibasic acid
0.01–2.0 parts by weight of a cationic amine lubricant
0.1–2.0 parts by weight of a Werner complex compound in which the carboxylato group coordinated with the trivalent nuclear chromium atom contains less than 7 carbon atoms in an aliphatic group and in which the aliphatic group also contains a highly functional group
0.01–0.5 parts by weight polyvinyl alcohol
0.005–0.05 parts by weight of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900
0.01–1.0 parts by weight of an organo silane and hydrolysis product thereof in which the silane has an organic group attached directly to the silicon atom having less than 7 carbon atoms and containing a highly functional group
99.615–89.45 parts by weight water.

18. In a product formed of glass fibers and a resinous material, the improvement which consists of a coating directly on the glass fiber surfaces to protect the glass fibers and to enhance the bonding relationship between the resinous material and the glass fiber surfaces in which the coating is formed of the following ingredients set forth in the proportions by weight:

0.25–5.0 parts by weight saturated polyester resin formed essentially by the condensation reaction of a saturated dibasic acid and a dihydric alcohol 0.01–2.0 parts by weight methacrylato chromic chloride 0.1–2.0 parts by weight of a cationic amine lubricant 0.01–1.0 parts by weight of an organo silane and hydrolysis product thereof in which the silane has an organic group attached directly to the silicon atom containing less than 7 carbon atoms and a highly functional group 0.005–0.05 parts by weight of a co-generic mixture of conjugated polyoxyethylene-polyoxypropylene compounds on a polybasic carboxylic acid having a molecular weight less than 200 in which the polyoxyethylene groups are present in amounts ranging from 20–90 percent by weight of the compound and in which the molecular weight of the compound is at least 900

99.615–89.45 parts by weight water.

References Cited by the Examiner
UNITED STATES PATENTS

| | | | |
|---|---|---|---|
| 2,392,805 | 1/1946 | Biefeld | 117—126 |
| 2,674,619 | 4/1954 | Lundsted | 260—33.4 |
| 2,688,007 | 8/1954 | Steinman | 117—126 |
| 2,801,189 | 7/1957 | Collier | 117—126 |
| 3,081,195 | 3/1963 | Biefeld et al. | 117—126 |

OTHER REFERENCES

"Elvanol Polyvinyl Alcohols," issued by E. I. du Pont de Nemours and Co. (Inc.), Wilmington, Del. (page 20).

RICHARD D. NEVIUS, *Primary Examiner.*

JOSEPH B. SPENCER, *Examiner.*

R. B. MURRAY, R. S. KENDALL, *Assistant Examiners.*